(12) United States Patent
Douglas

(10) Patent No.: US 10,503,497 B2
(45) Date of Patent: Dec. 10, 2019

(54) TECHNIQUES FOR UTILIZING AN EXPRESSION LANGUAGE IN SERVICE CONFIGURATION FILES

(71) Applicant: Microsoft Technology Licensing, LLC, Redmond, WA (US)

(72) Inventor: Clifton Timothy Douglas, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/883,834

(22) Filed: Jan. 30, 2018

(65) Prior Publication Data

US 2019/0235862 A1 Aug. 1, 2019

(51) Int. Cl.
*G06F 8/76* (2018.01)
*G06F 8/41* (2018.01)
*G06F 8/65* (2018.01)

(52) U.S. Cl.
CPC ............. *G06F 8/76* (2013.01); *G06F 8/44* (2013.01); *G06F 8/65* (2013.01)

(58) Field of Classification Search
CPC ........................................................ G06F 8/65
See application file for complete search history.

(56) References Cited

U.S. PATENT DOCUMENTS

| | | | |
|---|---|---|---|
| 7,412,691 B2 * | 8/2008 | Bognar | G06F 9/44505 707/999.2 |
| 7,761,484 B2 | 7/2010 | Christensen et al. | |
| 8,732,213 B2 * | 5/2014 | Sowell | G06F 16/245 707/809 |
| 9,231,946 B2 * | 1/2016 | Loo | H04L 63/029 |
| 9,298,847 B1 * | 3/2016 | Rohde | G06F 16/90 |
| 9,529,657 B2 * | 12/2016 | Jan | G06F 11/079 |
| 9,529,658 B2 * | 12/2016 | Jan | G06F 11/0709 |
| 9,552,237 B2 * | 1/2017 | Biesack | G06F 9/541 |

(Continued)

FOREIGN PATENT DOCUMENTS

WO 2017142519 A1 8/2017

OTHER PUBLICATIONS

"Adding dynamically JavaScript code with eval", Retrieved From: <<https://web.archive.org/web/20111231095533/http://www.xul.fr:80/javascript/eval.php>>, Retreived on: Oct. 27, 2017, 3 Pages.

(Continued)

*Primary Examiner* — Matthew J Brophy
(74) *Attorney, Agent, or Firm* — Arent Fox LLP

(57) ABSTRACT

Described are examples for processing a configuration file having a certain file format for defining static values. One or more static data values defined in the configuration file based on the JSON format can be determined. One or more expressions, defined according to an expression language, can be detected in the configuration file based on the file format. Via a platform engine and based on the expression language, the one or more expressions can be interpreted. The one or more static data values and the one or more expressions can be stored in memory as an in-memory representation of the configuration. An instance of a service for resolving one or more values related to the one or more expressions can be executed by the platform engine and based on the representation of the configuration.

17 Claims, 4 Drawing Sheets

(56) References Cited

U.S. PATENT DOCUMENTS

| | | | |
|---|---|---|---|
| 9,576,015 B1 | 2/2017 | Tolnay et al. | |
| 9,613,068 B2* | 4/2017 | Tsirogiannis | G06F 16/211 |
| 9,712,511 B2* | 7/2017 | Loo | H04L 63/029 |
| 9,825,881 B2* | 11/2017 | Johnston | H04L 47/827 |
| 9,910,697 B2* | 3/2018 | DeArment | G06F 9/44505 |
| 9,935,959 B2* | 4/2018 | Keith | H04L 41/50 |
| 2007/0156383 A1* | 7/2007 | Zenz | G06F 9/44505 703/22 |
| 2010/0235813 A1 | 9/2010 | Manczak et al. | |
| 2012/0191840 A1* | 7/2012 | Gordon | H04L 29/12594 709/223 |
| 2014/0279838 A1* | 9/2014 | Tsirogiannis | G06F 16/211 707/603 |
| 2015/0229613 A1* | 8/2015 | Baum | G06F 16/00 713/171 |
| 2015/0278245 A1* | 10/2015 | Sagar | G06F 16/178 707/610 |
| 2016/0094483 A1* | 3/2016 | Johnston | H04L 47/827 709/226 |
| 2016/0147578 A1* | 5/2016 | Biesack | G06F 9/541 719/328 |
| 2017/0046135 A1* | 2/2017 | Hazarika | G06F 9/451 |
| 2017/0177307 A1 | 6/2017 | Shakespeare et al. | |
| 2017/0285982 A1* | 10/2017 | DeArment | G06F 9/44505 |
| 2018/0013579 A1* | 1/2018 | Fairweather | H04L 67/125 |
| 2018/0077084 A1* | 3/2018 | Johnston | H04L 47/827 |
| 2018/0077129 A1* | 3/2018 | Baum | G06F 16/00 |
| 2018/0150284 A1* | 5/2018 | Young | G06F 8/36 |

OTHER PUBLICATIONS

"Application Developer's Guide—Chapter 20", Retreived From <https://docs.marklogic.com/guide/app-dev/json>>, Retreived on: Oct. 27, 2017,18 Pages.

"Transforming and Indexing Custom JSON", Retreived From <<https://lucene.apache.org/soldguide/6_6/transforming-and-indexing-custom-json.html>>, Retreived on: Oct. 27, 2017, 7 Pages.

"International Search Report and Written Opinion Issued in PCT Application No. PCT/US19/013725", dated Apr. 16, 2019, 15 Pages.

* cited by examiner

TECHNIQUES FOR UTILIZING AN EXPRESSION LANGUAGE IN SERVICE CONFIGURATION FILES

BACKGROUND

Services or other applications, such as web services, can utilize configuration files to initialize parameters, where the configuration files can be read and parsed by the services at runtime (or before) to set associated parameters for operation. Such configuration files are typically static in nature, and allow for defining the parameters for the service based on a format and/or using certain name/value pairs identifiable by the service. In addition, many services use standardized formatting for the configuration files, such as JavaScript Object Notation (JSON), eXtensible Markup Language (XML), etc., to ensure that the configuration files are appropriately formatted. Typically, a service attempts to identify certain name/value pairs in the configuration files that are specific to static configuration values for use in configuring the service for use.

SUMMARY

The following presents a simplified summary of one or more implementations in order to provide a basic understanding of such implementations. This summary is not an extensive overview of all contemplated implementations, and is intended to neither identify key or critical elements of all implementations nor delineate the scope of any or all implementations. Its sole purpose is to present some concepts of one or more implementations in a simplified form as a prelude to the more detailed description that is presented later.

In an example, a computer implemented method for processing a configuration file having a file format is provided. The method includes determining one or more static data values defined in the configuration file based on the file format, detecting one or more expressions, defined according to an expression language, in the configuration file based on the file format, interpreting, via a platform engine and based on the expression language, the one or more expressions, storing, in a memory and based on interpreting the one or more expressions, the one or more expressions and the one or more static data values as a representation of the configuration, and executing, by the platform engine and based on the representation of the configuration, an instance of a service for resolving one or more values related to the one or more expressions.

In another example, a device for processing a configuration file having a file format is provided. The device includes a memory storing one or more parameters or instructions for providing a platform engine and for storing an in-memory representation of the configuration file for executing one or more contexts of the platform engine, and at least one processor coupled to the memory. The at least one processor is configured to determine one or more static data values defined in the configuration file based on the file format, detect one or more expressions, defined according to an expression language, in the configuration file based on the file format, interpret, via the platform engine and based on the expression language, the one or more expressions, store, in the memory and based on interpreting the one or more expressions, the one or more expressions and the one or more static data values as the in-memory representation of the configuration, and execute, by the platform engine and based on the in-memory representation of the configuration, an instance of a service for resolving one or more values related to the one or more expressions.

In another example, a computer-readable medium, including code executable by one or more processors for processing a configuration file having a file format, is provided. The code includes code for determining one or more static data values defined in the configuration file based on the file format, detecting one or more expressions, defined according to an expression language, in the configuration file based on the file format, interpreting, via a platform engine and based on the expression language, the one or more expressions, storing, in a memory and based on interpreting the one or more expressions, the one or more expressions and the one or more static data values as a representation of the configuration, and executing, by the platform engine and based on the representation of the configuration, an instance of a service for resolving one or more values related to the one or more expressions.

To the accomplishment of the foregoing and related ends, the one or more implementations comprise the features hereinafter fully described and particularly pointed out in the claims. The following description and the annexed drawings set forth in detail certain illustrative features of the one or more implementations. These features are indicative, however, of but a few of the various ways in which the principles of various implementations may be employed, and this description is intended to include all such implementations and their equivalents.

DETAILED DESCRIPTION

Figure 1:
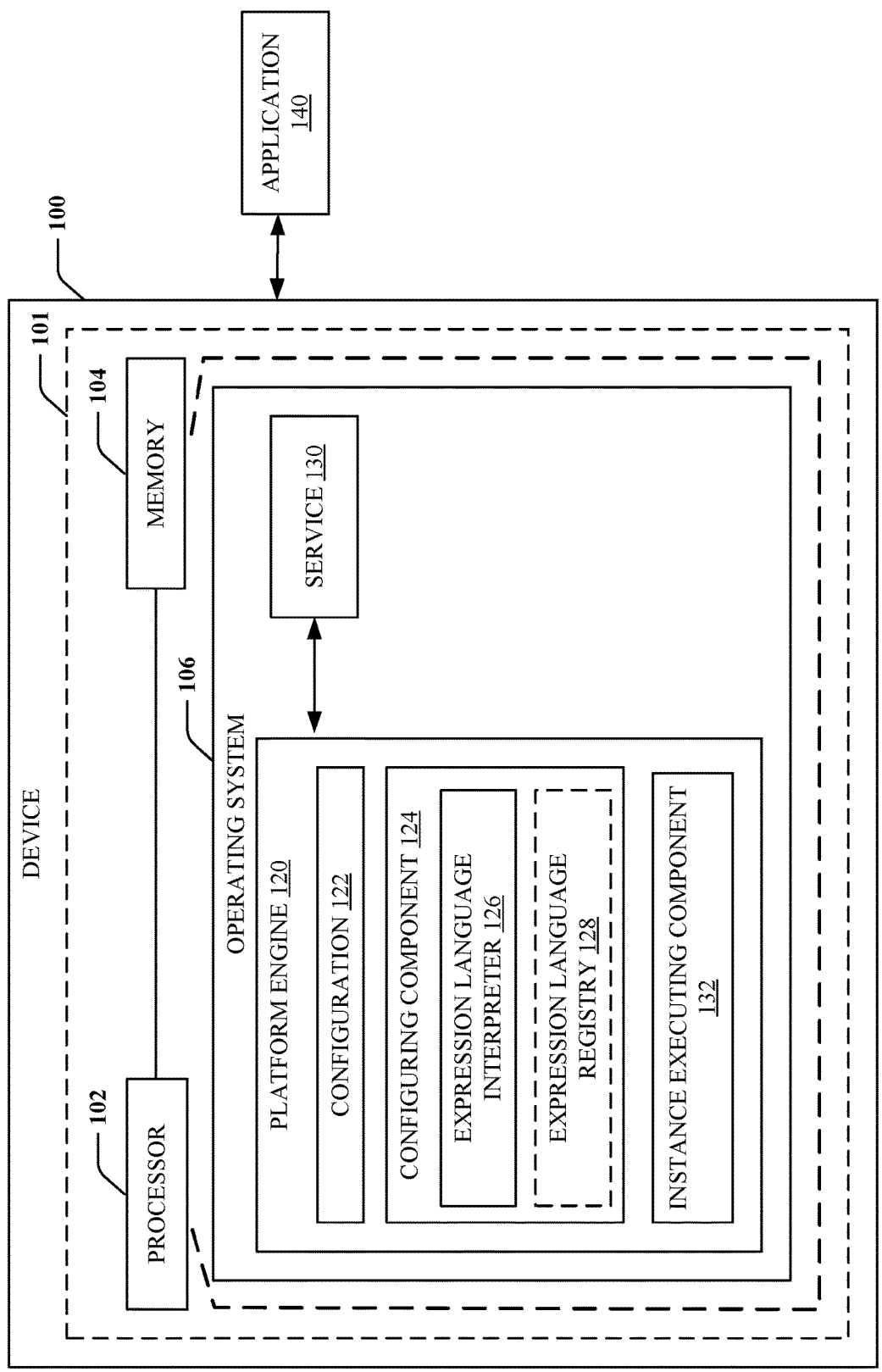
FIG. 1 is a schematic diagram of an example of a device that can store and process configuration files defined according to a file format in accordance with examples described herein.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known components are shown in block diagram form in order to avoid obscuring such concepts.

This disclosure describes various examples related to utilizing an expression language in configuration files defined for a service to allow for obtaining dynamic data values and/or logic for the configuration files. For example, the expression language can be defined in a standardized format of the configuration files so that a configuration file including the expression language can comply with the standardized format and/or be validated by a tool or interpreter for reading the configuration files. For example, the standardized format can include JavaScript Object Notation (JSON), eXtensible Markup Language (XML), etc., and can include syntax for defining name/value pairs. In this regard, the name/value pairs can be used to define the expression language.

For example, an expression language interpreter can detect and interpret expressions in the configuration file that comply with a format of the expression language, while also complying with the standardized format of the configuration files. For example, the expression language can leverage the syntax of the standardized format (e.g., name/value pairs) to define literals, functions, etc. for the expression language. In one example, a name/value pair can be used to define literals as having a label (e.g., the name of the name/value pair) and a value (e.g., the value of the name/value pair), and the literals may be of one or more types that can be detected based at least in part on a format of the value. In another example, a name/value pair can be used to define a function as having an identifier of a function (e.g., the name of the name/value pair), a name of the function (e.g., a value of the name/value pair), and a set of arguments (e.g., where the name of another name/value pair identifies that arguments are provided, and the value provides one or more arguments according to an argument format).

In this regard, the expression language interpreter can execute as part of the service, or at least an application or service that configures the service, to read/parse the configuration files and execute detected expression language expressions in the configuration file. In one example, the service can register functions that can be called in the expression language expressions, and in this regard, the expression language interpreter can identify a function in the configuration file based on detecting the function identifier (e.g., as a name in the name/value pair) and the function name (e.g., as the value in the name/value pair), and can load the configuration file in a memory accessible by the platform engine. The platform engine, e.g., via a provided service, can accordingly call the registered function (e.g., with corresponding arguments indicated in the expression) to resolve configuration values in executing an instance of the service. This process can allow for defining a domain-specific programming language for the platform engine that has a syntax allowing for embedding of domain-specific programming language expressions into configuration files that can be evaluated at runtime with contextual information provided by the execution environment.

Figure 2:
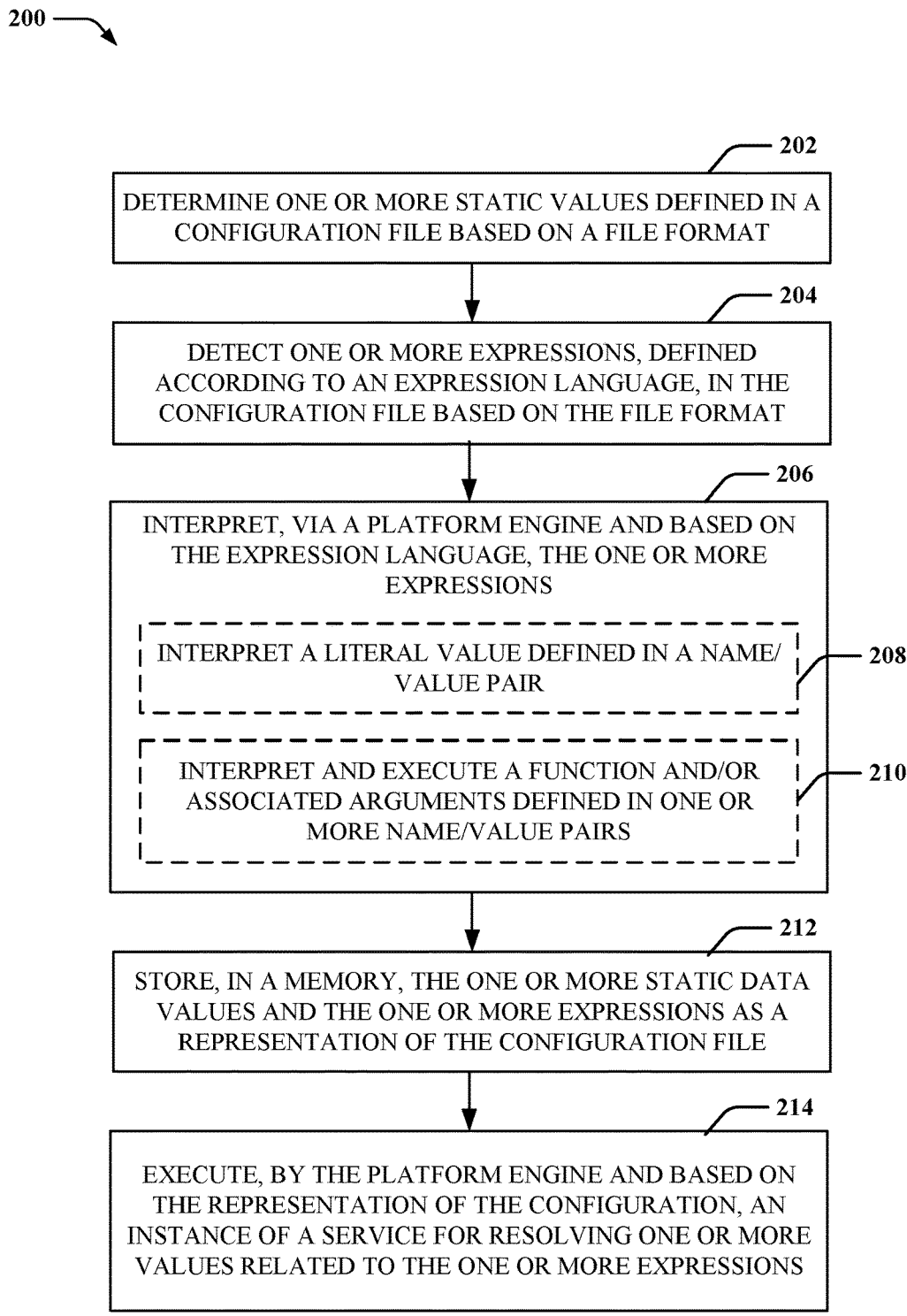
FIG. 2 is a flow diagram of an example of a method for interpreting and storing a representation of a configuration file having one or more defined expressions in accordance with examples described herein.
Figure 3:
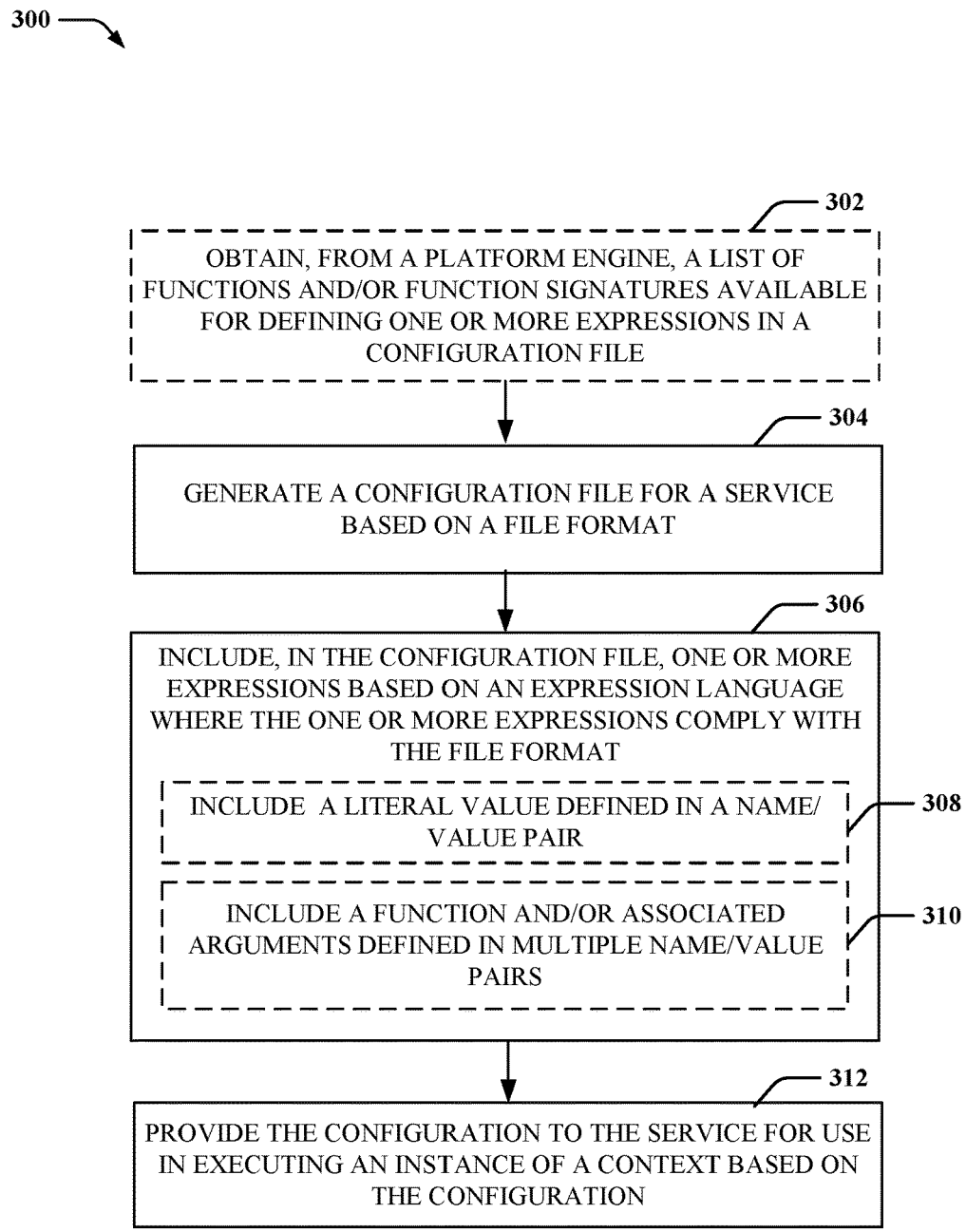
FIG. 3 is a flow diagram of an example of a method for generating a configuration file having one or more defined expressions in accordance with examples described herein.
Figure 4:
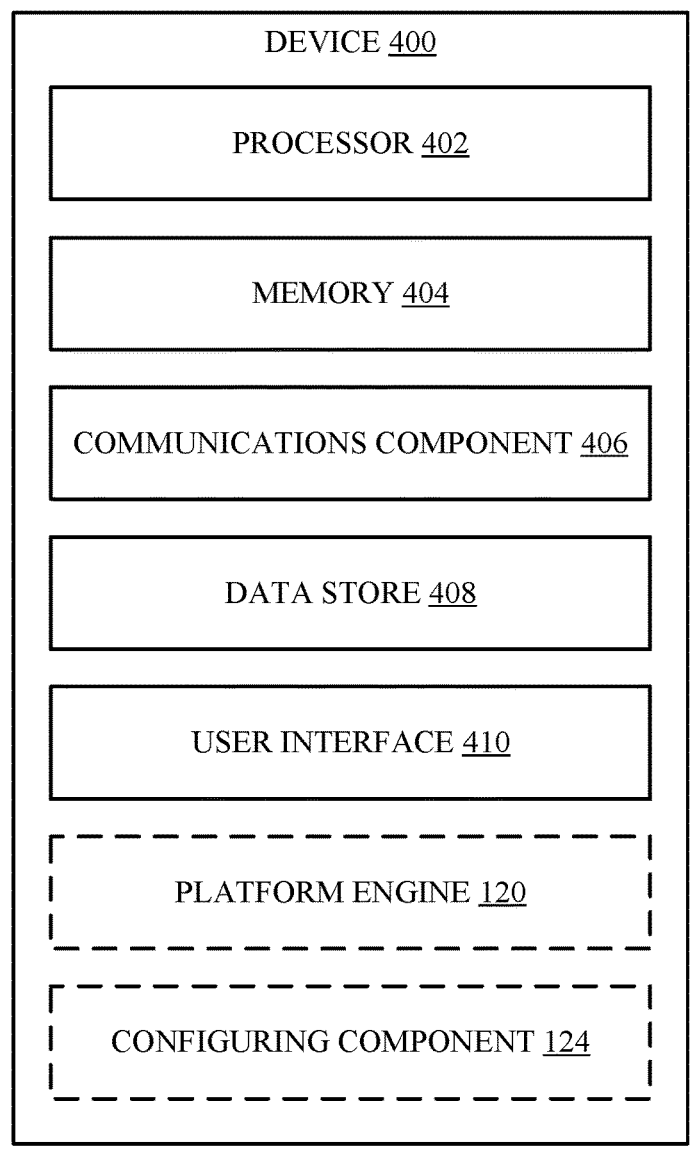
FIG. 4 is a schematic diagram of an example of a device for performing functions described herein.

Turning now to FIGS. 1-4, examples are depicted with reference to one or more components and one or more methods that may perform the actions or operations described herein, where components and/or actions/operations in dashed line may be optional. Although the operations described below in FIGS. 2-4 are presented in a particular order and/or as being performed by an example component, the ordering of the actions and the components performing the actions may be varied, in some examples, depending on the implementation. Moreover, in some examples, one or more of the actions, functions, and/or described components may be performed by a specially-programmed processor, a processor executing specially-programmed software or computer-readable media, or by any other combination of a hardware component and/or a software component capable of performing the described actions or functions.

FIG. 1 is a schematic diagram of an example of a device 100 (e.g., a computing device) that can interpret and process expression language syntax in a configuration file for a provided service. In an example, device 100 can include a processor 102 and/or memory 104 configured to execute or store instructions or other parameters related to providing an operating system 106, which can execute one or more platform engines 120, services 130, etc. For example, processor 102 and memory 104 may be separate components communicatively coupled by a bus (e.g., on a motherboard or other portion of a computing device, on an integrated circuit, such as a system on a chip (SoC), etc.), components integrated within one another (e.g., processor 102 can include the memory 104 as an on-board component 101), and/or the like. Memory 104 may store instructions, parameters, data structures, etc., for use/execution by processor 102 to perform functions described herein.

Operating system 106 may execute platform engine 120 configured to execute one or more backend components for providing a service 130, which may be a web service or other service that can allow connectivity to an application 140 for accessing one or more functions of the service 130. For example, the application 140 can execute an instance of the service 130 via a webpage in a web browser, an application that communicates with the service 130, and/or the like, on a device (not shown) that may be remotely located from the device 100. For example, the platform engine 120 may be operable for initializing and executing the service 130, or one or more contexts of the service, configuring one or more parameters for executing the service 130, etc. For example, a context of the service can relate to an execution of the service 130 given a set of parameters configured by the platform engine. An instance of the service can correspond to one or more instances that can execute with a specific context (e.g., a user or subscriber context) to provide data to the application 140 relating to the context (e.g., via an interface to the service 130 and one or more parameters specific to the instance, such as an instance or session identifier, subscription information for a subscriber of the service 130 or platform, and/or the like).

In an example, the platform engine 120 can include a configuration 122 for configuring one or more parameters for executing the platform engine 120 and/or the corresponding service 130, a configuring component 124 for configuring the platform engine 120 and/or service 130 based on the configuration, and/or an instance executing component 132 for executing an instance of the service 130 for application 140 based on the configuration 122, as described, for providing platform functionality to the application 140 (e.g., via service 130). The configuring component 124 can include an expression language interpreter 126 for detecting and processing expression language syntax indicated in the configuration 122 and/or an optional expression language registry 128 for storing one or more definitions of functions that can be executed using the expression language. In this regard, configuration 122 can include a configuration file formatted based on a syntax of a standardized format, such as JSON, XML, etc., where the configuration file can define expressions that comply with the standardized format and can be interpreted by the expression language interpreter 126 such to allow specifying dynamic configuration values in configuration 122. This, in turn, may allow for configuring functionality at the platform engine 120 by using the otherwise static configuration 122 without necessarily having to modify the platform engine 120 software itself.

For example, the expression language interpreter 126 can detect certain characters or values in the configuration 122 that can be indicative of the expression language syntax, and can accordingly process the expression language syntax in the configuration 122. This may result, for example, in platform engine 120 loading an in-memory representation of the configuration 122 (e.g., in memory 104) that includes static values that may be defined in the configuration as well as dynamic values that can be resolved by processing the corresponding expression language syntax. The expression language may define literal values, functions, etc., and/or may allow for specifying custom functions via the optional expression language registry 128.

FIG. 2 is a flowchart of an example of a method 200 for interpreting expressions in a configuration file. For example, method 200 can be performed by a device 100, and/or one or more components thereof, to process configuration files having expression language syntax.

In method 200, at action 202, one or more static values defined in a configuration file based on a file format can be determined. In an example, configuring component 124, e.g., in conjunction with processor 102, memory 104, operating system 106, platform engine 120, etc., can determine the one or more static values defined in the configuration file (e.g., configuration 122) based on the file format. As described, the configuration 122 can be of a standardized format for defining configuration values, such as a JSON format, XML format, or other format that allows for specifying name/value pairs. For example, the configuration files can typically be used to indicate name/value pairs that can be parsed by an application or service to determine and utilize the configuration values for certain variable indicated by the name. Though the configuration files allow for specifying variable values for certain parameters, the nature of the configuration files themselves is conventionally static such that the configuration file itself does not change. In this regard, configuration 122 may include some static values defined according to the file format (e.g., as name/value pairs), and the configuring component 124 can parse the configuration 122 and determine at least some static values indicated in the configuration file.

In method 200, at action 204, one or more expressions defined according to an expression language can be detected in the configuration file based on the file format. In an example, expression language interpreter 126, e.g., in conjunction with processor 102, memory 104, operating system 106, platform engine 120, configuring component 124, etc., can detect the one or more expressions, defined according to an expression language, in the configuration file (e.g., configuration 122) based on the file format. As described, the expression language may include a syntax that complies with the file format (e.g., such as by allowing definition of expressions using the name/value pair format). For example, the syntax of the expression language may allow for defining literals where the name of the name value pair can be a string (e.g., defined by quotations) representing the name of the literal, and the value of the name value pair can be the value of the literal. In this example, the expression language interpreter 126 may detect a literal value expression in the configuration 122 based on detecting a string for the name of the name value pair.

In another example, the syntax of the expression language may allow for defining functions where the name of the name value pair can be an indicator of a function (e.g., a string reserved for indicating functions), and the value of the name value pair can be the name of the function, which can be called on the platform engine 120. In addition, in this example, the function name/value pair can be followed by a list of arguments for the function, which can be indicated as another name/value pair having a name as an indicator of arguments (e.g., a string reserved for indicating function arguments) and a value indicating a list of one or more arguments for the function, which may include static values, literals as defined above, etc. In this example, the expression language interpreter 126 may detect the function based on detecting the string reserved for indicating functions and/or can identify corresponding arguments based on identifying the string reserved for indicating arguments.

In method 200, at action 206, the one or more expressions can be interpreted, via a platform engine and based on the expression language. In an example, expression language interpreter 126, e.g., in conjunction with processor 102, memory 104, operating system 106, platform engine 120, configuring component 124, etc., can interpret, via the platform engine 120 and based on the expression language, the one or more expressions. For example, the expression language interpreter 126 can execute to read one or more configuration files (e.g., configuration 122), and interpret the expressions to allow for indicating dynamic values in the configuration, as described above and further herein. In this example, the expression language interpreter 126 can compile or otherwise validate the expressions by ensuring the expressions use the correct syntax to be interpreted as literals, functions, arguments for functions, etc., as described further herein. In an example, this may include verifying that function names, the list of arguments (e.g., number and/or types of the arguments) for one or more functions indicated in the one or more expressions match a signature of a function registered with the platform engine 120, as described further herein. If not, for example, the expression language interpreter 126 may generate an error for presenting on the platform engine 120 in a log file, etc. indicating that one or more expressions in the configuration 122 were invalid.

For example, interpreting the one or more expressions at action 206 may optionally include, at action 208, interpreting a literal value defined in a name/value pair. In an example, expression language interpreter 126, e.g., in conjunction with processor 102, memory 104, operating system 106, platform engine 120, configuring component 124, etc., can interpret the literal value defined in the name/value pair. For example, as described the expression language interpreter 126 can detect the literal value based on detecting a syntax of a literal value, which may include detecting a variable name of the literal value that is a string marked by quotation marks or some other indicator. In a specific example, for complying with a JSON file format, the expression language may allow for definition of literals of various types as {"name": value}. For example, the literals may include strings, numbers (e.g., 64-bit integers), Boolean, decimal, or date values defined, respectively, based on the following syntax:

{"string": "example string"}
{"number": 123}
{"bool": true}
{"decimal": 3.14}
{"date": "2017-09-26"}

For example, the expression language interpreter 126 may detect the literal value based on detecting the variable name portion of the name/value pair as having quotations (e.g., "string"), and may interpret the literal value based at least in part on identifying a type of the data in the value portion of the name/value pair (e.g., quotations can indicate string or date, which can be further identified based on the format of the value, numbers and decimals can be identified based on no quotations and identifying numbers with or without a decimal point, Booleans can be identified as true or false without quotations, etc.

In addition, for example, interpreting the one or more expressions at action 206 may optionally include, at action 210, interpreting and executing a function and/or associated arguments defined in one or more name/value pairs. In an example, expression language interpreter 126, e.g., in conjunction with processor 102, memory 104, operating system 106, platform engine 120, configuring component 124, etc., can interpret and execute the function and/or associated arguments defined in the one or more name/value pairs. For example, as described the expression language interpreter 126 can detect the function call based on detecting a syntax of a function, which may include detecting a name portion of a name/value pair that indicates a function. In a specific example, for complying with a JSON file format, the expression language may allow for definition of a function by using the following syntax: {"f": "function name", "args": [arguments]}, where the arguments can be other expressions, such as literal values, other function calls, etc. In this example, the expression language interpreter 126 can interpret the function based on detecting the "f" name of a name/value pair, and can interpret the function name to call based on the value portion.

For example, the function name can correspond to a function registered on the platform engine 120 as a function callable using the expression language, and thus the expression language interpreter 126 can verify that the function name is registered at the platform engine 120 before proceeding with processing other expressions in the configuration 122. In this regard, in one example, interpreting the function at action 210 can include determining whether the function is registered on the platform engine 120. If not, for example, expression language interpreter 126 can return an exception or error value for the function, log an error in interpreting the configuration file, and/or the like. In addition, the expression language interpreter 126 can interpret the corresponding arguments for the function based on detecting the "args" name of a subsequent name/value pair, and can interpret the arguments as the value portion of the name/value pair. In this regard, for example, the expression language interpreter 126 can pass the argument values when calling the function via platform engine 120. Similarly, in this regard, interpreting the function at action 210 can further include determining whether the format of the arguments (e.g., number of arguments, types of arguments, etc.) match a signature of the registered function, and if not expression language interpreter 126 can return an exception or error value for the function, log an error, etc. Where the arguments include additional expressions, the expression language interpreter 126 can first detect and interpret the expressions, as described above, to verify that the additional expressions are also valid syntax, correspond to registered functions, comply with function signatures, etc.

In method 200, at action 212, the one or more static data values and the one or more expressions can be stored, in a memory, as a representation of the configuration file. In an example, configuring component 124, e.g., in conjunction with processor 102, memory 104, operating system 106, platform engine 120, etc., can store, in the memory (e.g., memory 104), the one or more static data values and the one or more expressions as a representation of the configuration file (e.g., configuration 122). This can occur after interpreting the configuration 122, and thus the in-memory representation of the configuration can be a compiled and/or otherwise validated representation, which can be used for executing one or more instances of the service 130. For example, this in-memory representation of the configuration 122 can be used to configure the platform engine 120 to execute a certain service 130, and/or one or more instances of that service 130, to provide platform services to one or more applications 140 that instantiate the instance of the service 130. In this regard, the configuration 122 can specify dynamic values to be resolved for an instance of the service 130 by use of the expression language, which may allow for executing an instance of the service 130 where the dynamic values in the in-memory representation of the configuration 122 can resolve to values specific to a user subscription or other context.

In method 200, at action 214, an instance of the service can be executed, by the platform engine and based on the representation of the configuration, for resolving one or more values related to the one or more expressions. In an example, instance executing component 132, e.g., in conjunction with processor 102, memory 104, operating system 106, platform engine 120, etc., can execute, via the platform engine 120 and based on the representation of the configuration (e.g., configuration 122), the instance of the service 130 for resolving one or more values related to the one or more expressions. For example, instance executing component 132 can execute an instance of the service 130 based on a request from the application 140. In an example, the request from the application 140 may include one or more parameters that may assist in resolving the one or more expressions in the in-memory representation of the configuration 122. For example, the request may include one or more parameters related to a user subscription, context, etc., such as a subscriber identifier, which can be used to access one or more subscriber parameters, etc. This may allow for modification of, or otherwise accessing of, the platform engine 120 or one or more services 130 provided by the platform engine 120, where the one or more expressions can resolve to parameters related to a user subscription or other context, as described.

In a specific example, the platform engine 120 can define a rewards platform for awarding points to user profiles as users use an application or service. The platform engine 120 may have various functions that can be performed by corresponding services 130 or related contexts, such as functions for awarding points to users for certain detected activities, displaying ways to earn points, redeem points for merchandise, etc. An expression language, as described herein, can be used to configure the functions of the rewards platform by allowing specifying of expressions in configuration files that may allow for obtaining contextual values without having to specify multiple configuration files for multiple different values. For example, allowing use of an expression language in the configuration files, as described above, can enable the rewards platform to provide dynamic attributes in the configuration files by using the expressions, such as the maximum number of points or activities that can be rewardable for user, the amount of points a user receives for doing an activity, an indication of whether the user is eligible to get points for an activity, an indication of whether a promotion or redemption item is visible to the user, a display order of promotions or redemption items on the user interface, various attributes for promotions and redemption items (including title, images, localized text, etc.), and/or the like.

In addition, some possible functions defined and detectable by the expression language interpreter 126 for the rewards platform may include type conversion functions, such as to:string, to:date, to:number, to:bool, time manipulation functions, such as time, elapsed:seconds, elapsed: hours, elapsed:days, time+days, time+months, Boolean logic/comparisons, such as not ("!"), equal ("="), not equal ("!="), greater than (">"), greater than or equal (">="), less than ("<"), less than or equal ("<="), addition ("+"), subtraction ("-"), multiplication ("*"), division ("/"), modulo ("%"), min, max, etc., conjunctions functions, such as and, or, basic user data functions, such as profile, counter, balance, properties, set operation functions, such as inRange, contains, in, offer-specific functions, such as progress, eligible, complete, completiondate, activityprogress, activityprogresshistory, activitymax, pointprogress, pointmax, session functions, such as header, item, country, language, order functions, such as redeemcount, lastsku, etc. Thus, expression language interpreter 126 may allow for calling such functions in the configuration 122 for the rewards platform.

For one specific example, a notification can be configured in configuration 122 to trigger if the following condition evaluates to true:

```
{
    "f": ">=",
    "args": [
        {
            "f": "balance",
            "args": [ ]
        },
        {
            "f": "catalog:price",
            "args": [
                {
                    "f": "profile",
                    "args": [
                        {
                            "string": "goal"
                        }
                    ]
                }
            ]
        }
    ]
}
```

When an application 140 makes a request to the service 130, and the service 130 utilizes this configured notification, the expressions can be resolved based on the user subscription information. For example, the "balance" function can resolve to a point balance associated with the user profile. The "catalog:price" function can return a catalog price for an item that is passed into the function as a string (which ends up as the "goal" string in this example). The "profile" function can return a user profile parameter indicated by an argument passed in as a string. In this example, the "goal" string is passed as a parameter to the "profile" function to obtain a "goal" attribute from the user profile, which can relate to an identifier of a goal item that the user wishes to purchase with rewards. The "catalog:price" function returns the catalog price for that goal item. The ">=" function can compare two values and return true if the first value is greater than or equal to the second value, and in this case compares the user's point balance to the catalog price for the goal item. The ">=" function can return true if the user's point balance is greater than or equal to the catalog price for the goal item, or false otherwise.

FIG. 3 is a flowchart of an example of a method 300 for generating configuration files including dynamic expressions. For example, method 300 can be performed by a device 100, and/or one or more components thereof, by a user, developer, etc., to generate configuration files having expression language syntax.

In method 300, optionally at action 302, a list of functions and/or function signatures available for defining one or more expressions in a configuration file may be obtained from a platform engine. In an example, expression language registry 128, e.g., in conjunction with processor 102, memory 104, operating system 106, platform engine 120, etc., can obtain, from the platform engine (e.g., platform engine 120), a list of functions and/or function signatures available for defining one or more expressions in the configuration file. For example, the platform engine 120, in this regard, may allow for defining and registering of functions that can be subsequently interpreted by the expression language interpreter 126 (e.g., alternatively or in addition to functions that may be coded into the platform engine 120). For example, the functions can be defined with the name and corresponding function code.

In a specific example, a function can be provided for adding functions to the expression language registry 128 (e.g., which can be called via an interface to platform engine 120). This function may be similar to the following:

```
public interface IFunctionRegistry
{
    void Register(string name, Func<IExpression[ ], IExpression> func, string description, ArgumentsInfo, IEnumerable<IEnumerable<IExpression>> parameters = null);
    IExpression Compile(string name, IExpression[ ] args);
    IDictionary<string, FunctionInfo> AllFunctions( );
}
```

To register a function for returning a country from a user subscription in the specific rewards platform described above, for example, the above function may be called using the following:

registry.Register("country", Country, "return true if country is set to value, false otherwise", new ArgumentsInfo ("country"), arguments);

In addition, the following function expression can be registered:

```
public IExpression Country(IExpression[ ] arguments)
{
    if (arguments.Length != 1 || arguments[0].Type != Expression.ResultType.String)
    {
        throw new ArgumentOutOfRangeException("country needs 1 argument");
    }
}
```

```
    return builder.Build(
        Expression.ResultType.Bool,
        arguments,
        (args, input) =>
        {
            var market = input.Activity?.Country ?? marketProvider.Country;
            return string.Equals(market, arguments[0].Evaluate(input).StringValue,
StringComparison.InvariantCultureIgnoreCase);
        });
    }
```

In this example, once registered, the "country" function can be called in the configuration 122 using the expression language as:

```
{
    "f" : "country",
    "args" : [
        {
            "string" : "us"
        }
    ]
}
```

And can return true or false based on whether or not the country for the instance associated with the application 140 is "us." For example, the instance associated with the application 140 itself (e.g., input.Activity.Country) can indicate a country corresponding to the request, and the "country" function can obtain and use this country code in comparing to "us". If this country code is not available, the marketProvider.Country associated with the user subscription can be used and compared to "us." In either case, the "country" function can return true if the obtained country is "us" or false otherwise.

In an example, the registered function (and/or other functions) and the related signature, which may indicate arguments for the function, types of the arguments (e.g., string, number, Boolean, etc.), if any, and/or other information may be obtained from the platform engine 120. This information can be used in generating the configuration 122, as described herein, to allow for invoking the functions via the configuration 122 by using the correct syntax in calling the functions via the configuration 122. The functions can then be executed via the platform engine 120, as described above, based on the expression language interpreter 126 detecting the function syntax, verifying the function is registered on the platform engine 120 (e.g., based on verifying the function name in the configuration 122), verifying the arguments, if any, as specified in the configuration 122 are of the corrected type as for the function registered on the platform engine 120, etc.

In method 300, at action 304, a configuration file can be generated for a service based on a file format. In an example, configuring component 124, e.g., in conjunction with processor 102, memory 104, operating system 106, platform engine 120, etc., can generate, or be used to generate, the configuration file (e.g., configuration 122) for the service (e.g., service 130) based on the file format (e.g., JSON). For example, a developer may generate the configuration file using the configuring component 124, an independent device (e.g., and may load the configuration onto the platform engine 120), etc.

In any case, for example, at action 306, one or more expressions can be included in the configuration file based on an expression language where the one or more expressions comply with the file format. In an example, configuring component 124, e.g., in conjunction with processor 102, memory 104, operating system 106, platform engine 120, etc., can include, or be used to include, in the configuration file (e.g., configuration 122), the one or more expressions based on the expression language (e.g., as described above) where the one or more expressions comply with the file format. In addition, as described, this may optionally include including a literal value defined in a name/value pair, at action 308, and/or including a function and/or associated arguments defined in one or more name/value pairs, at action 310.

In method 300, at action 312, the configuration can be provided to the service for use in executing an instance of a context based on the configuration. In an example, configuring component 124, e.g., in conjunction with processor 102, memory 104, operating system 106, platform engine 120, etc., can provide the configuration (e.g., configuration 122) to the service (e.g., service 130 or platform engine 120) for use in executing an instance of the context based on the configuration. As described, for example, configuring component 124 can interpret the expressions in the configuration 122 and resolve one or more dynamic values for storing in an in-memory representation of the configuration 122. In the specific example described, configuring component 124 can interpret the values for a rewards platform user based on an invoked instance of the context by calling functions indicated in the expression language based on values in a user/subscriber profile. In any case, specification of dynamic configuration values can be used in this regard.

FIG. 4 illustrates an example of device 400, similar to or the same as device 100 (FIG. 1) including additional optional component details as those shown in Figure. In one implementation, device 400 may include processor 402, which may be similar to processor 102 for carrying out processing functions associated with one or more of components and functions described herein. Processor 402 can include a single or multiple set of processors or multi-core processors. Moreover, processor 402 can be implemented as an integrated processing system and/or a distributed processing system.

Device 400 may further include memory 404, which may be similar to memory 104 such as for storing local versions of applications being executed by processor 402, such as platform engine 120, configuring component 124, an operating system 106, other components thereof, applications, related instructions, parameters, etc. Memory 404 can include a type of memory usable by a computer, such as random access memory (RAM), read only memory (ROM), tapes, magnetic discs, optical discs, volatile memory, non-volatile memory, and any combination thereof.

Further, device 400 may include a communications component 406 that provides for establishing and maintaining communications with one or more other devices, parties, entities, etc., utilizing hardware, software, and services as described herein. Communications component 406 may carry communications between components on device 400 (e.g., display device 108), as well as between device 400 and external devices, such as devices located across a communications network and/or devices serially or locally connected to device 400. For example, communications component 406 may include one or more buses, and may further include transmit chain components and receive chain components associated with a wireless or wired transmitter and receiver, respectively, operable for interfacing with external devices.

Additionally, device 400 may include a data store 408, which can be any suitable combination of hardware and/or software, that provides for mass storage of information, databases, and programs employed in connection with implementations described herein. For example, data store 408 may be or may include a data repository for applications and/or related parameters (e.g., platform engine 120, configuring component 124, an operating system 106, other components thereof, applications, etc.) not currently being executed by processor 402. In addition, data store 408 may be or include a data repository for platform engine 120, configuring component 124, an operating system 106, other components thereof, applications, and/or one or more other components of the device 400.

Device 400 may include a user interface component 410 operable to receive inputs from a user of device 400 and further operable to generate outputs for presentation to the user. User interface component 410 may include one or more input devices, including but not limited to a keyboard, a number pad, a mouse, a touch-sensitive display, a navigation key, a function key, a microphone, a voice recognition component, a gesture recognition component, a depth sensor, a gaze tracking sensor, a switch/button, any other mechanism capable of receiving an input from a user, or any combination thereof. Further, user interface component 410 may include one or more output devices, including but not limited to a display, a speaker, a haptic feedback mechanism, a printer, any other mechanism capable of presenting an output to a user, or any combination thereof.

Device 400 may additionally include and/or be communicatively coupled with a platform engine 120, configuring component 124, components thereof, etc. for providing the functionalities described herein.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more implementations, one or more of the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

The previous description is provided to enable any person skilled in the art to practice the various implementations described herein. Various modifications to these implementations will be readily apparent to those skilled in the art, and the generic principles defined herein may be applied to other implementations. Thus, the claims are not intended to be limited to the implementations shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various implementations described herein that are known or later come to be known to those of ordinary skill in the art are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A computer implemented method for processing a configuration file having a JavaScript Object Notation (JSON) format, comprising:
    determining one or more static data values defined in the configuration file based on the JSON format;
    detecting one or more expressions, defined according to an expression language, in the configuration file based on the JSON format;
    interpreting, via a platform engine and based on the expression language, the one or more expressions, wherein interpreting the one or more expressions comprises interpreting a function in at least two name value pairs, wherein a name of a first one of the at least two name value pairs includes a string reserved for indicating functions and a value of the first one of the at least two name value pairs indicates a function name of the function, and wherein a name of a second one of the at least two name value pairs includes a string reserved for indicating a list of one or more arguments for the function in a value of the second one of the at least two name value pairs, and wherein the value of the second one of the at least two name value pairs indicates the list of one or more arguments;
    storing, in a memory and based on interpreting the one or more expressions, the one or more expressions and the one or more static data values as a representation of the configuration file; and executing, by the platform engine and based on the representation of the configuration file, an instance of a service for resolving one or more values related to the one or more expressions and using the one or more static data values and the one or more values related to the one or more expressions, as resolved in the representation of the configuration file, to configure the platform engine for executing the service.

2. The computer implemented method of claim 1, wherein interpreting the one or more expressions comprises interpreting a literal value in a name value pair, wherein a name of the name value pair indicates a variable name of the literal value and a value of the name value pair indicates a variable value of the literal value.

3. The computer implemented method of claim 1, wherein at least one of the one or more arguments include one or more other expressions defined in the expression language.

4. The computer implemented method of claim 1, wherein interpreting the function comprises determining whether the function is defined by the platform engine.

5. The computer implemented method of claim 4, wherein interpreting the function further comprises verifying that one or more arguments specified for the function are of a type defined in a signature for the function as defined by the platform engine.

6. The computer implemented method of claim 4, wherein executing the instance of the service comprises calling, based on determining that the function is defined by the platform engine, the function on the platform engine with the one or more arguments, wherein at least one of the one or more arguments correspond to the instance of the service.

7. A device for processing a configuration file having a JavaScript Object Notation (JSON) format, comprising:
a memory storing one or more parameters or instructions for providing a platform engine and for storing an in-memory representation of the configuration file for executing one or more contexts of the platform engine; and
at least one processor coupled to the memory, wherein the at least one processor is configured to:
determine one or more static data values defined in the configuration file based on the JSON format;
detect one or more expressions, defined according to an expression language, in the configuration file based on the JSON format;
interpret, via the platform engine and based on the expression language, the one or more expressions, wherein interpreting the one or more expressions comprises interpreting a function in at least two name value pairs, wherein a name of a first one of the at least two name value pairs includes a string reserved for indicating functions and a value of the first one of the at least two name value pairs indicates a function name of the function, and wherein a name of a second one of the at least two name value pairs includes a string reserved for indicating a list of one or more arguments for the function in a value of the second one of the at least two name value pairs, and wherein the value of the second one of the at least two name value pairs indicates the list of one or more arguments;
store, in the memory and based on interpreting the one or more expressions, the one or more expressions and the one or more static data values as the in-memory representation of the configuration file; and
execute, by the platform engine and based on the in-memory representation of the configuration file, an instance of a service for resolving one or more values related to the one or more expressions and using the one or more static data values and the one or more values related to the one or more expressions, as resolved in the representation of the configuration file, to configure the platform engine for executing the service.

8. The device of claim 7, wherein the at least one processor is configured to interpret the one or more expressions as a literal value in a name value pair, wherein a name of the name value pair indicates a variable name of the literal value and a value of the name value pair indicates a variable value of the literal value.

9. The device of claim 7, wherein at least one of the one or more arguments include one or more other expressions defined in the expression language.

10. The device of claim 7, wherein the at least one processor is configured to interpret the function at least in part by determining whether the function is defined by the platform engine.

11. The device of claim 10, wherein the at least one processor is further configured to interpret the function at least in part by verifying that one or more arguments specified for the function are of a type defined in a signature for the function as defined by the platform engine.

12. The device of claim 10, wherein the at least one processor is configured to execute the instance of the service at least in part by calling, based on determining that the function is defined by the platform engine, the function on the platform engine with the one or more arguments, wherein at least one of the one or more arguments correspond to the instance of the service.

13. A non-transitory computer-readable medium, comprising code executable by one or more processors for processing a configuration file having a JavaScript Object Notation (JSON) format, the code comprising code for:
determining one or more static data values defined in the configuration file based on the JSON format;
detecting one or more expressions, defined according to an expression language, in the configuration file based on the JSON format;
interpreting, via a platform engine and based on the expression language, the one or more expressions, wherein interpreting the one or more expressions comprises interpreting a function in at least two name value pairs, wherein a name of a first one of the at least two name value pairs includes a string reserved for indicating functions and a value of the first one of the at least two name value pairs indicates a function name of the function, and wherein a name of a second one of the at least two name value pairs includes a string reserved for indicating a list of one or more arguments for the function in a value of the second one of the at least two name value pairs, and wherein the value of the second one of the at least two name value pairs indicates the list of one or more arguments;
storing, in a memory and based on interpreting the one or more expressions, the one or more expressions and the one or more static data values as a representation of the configuration file; and
executing, by the platform engine and based on the representation of the configuration file, an instance of a service for resolving one or more values related to the one or more expressions and using the one or more static data values and the one or more values related to the one or more expressions, as resolved in the representation of the configuration file, to configure the platform engine for executing the service.

14. The non-transitory computer-readable medium of claim 13, wherein the code for interpreting interprets the one or more expressions as a literal value in a name value pair, wherein a name of the name value pair indicates a variable name of the literal value and a value of the name value pair indicates a variable value of the literal value.

15. The non-transitory computer-readable medium of claim 13, wherein at least one of the one or more arguments include one or more other expressions defined in the expression language.

16. The non-transitory computer-readable medium of claim 13, wherein the code for interpreting interprets the function at least in part by determining whether the function is defined by the platform engine.

17. The non-transitory computer-readable medium of claim 13, further comprising code for registering, via the platform engine, the expression of the function and logic for executing the function.

\* \* \* \* \*